United States Patent [19]

Reneau

[11] 4,323,923
[45] Apr. 6, 1982

[54] AGC-CLAMPED VIDEO AMPLIFIER

[75] Inventor: Daniel L. Reneau, Elmhurst, Ill.

[73] Assignee: Zenith Radio Corporation, Glenview, Ill.

[21] Appl. No.: 194,170

[22] Filed: Oct. 6, 1980

[51] Int. Cl.³ .............................................. H04N 5/16
[52] U.S. Cl. .................................. 358/171; 358/174; 358/176; 358/184
[58] Field of Search ............... 358/174, 176, 171, 172, 358/184

[56] References Cited

U.S. PATENT DOCUMENTS

| | | |
|---|---|---|
| 3,543,169 | 11/1970 | Hill .................................. 358/171 X |
| 3,569,620 | 3/1971 | Baun ............................... 358/174 X |
| 3,819,859 | 6/1974 | Borsuk et al. ................... 358/172 X |
| 3,970,895 | 7/1976 | Willis . . |
| 4,032,973 | 6/1977 | Haynes ................................ 358/176 |
| 4,184,176 | 1/1980 | Sahara et al. . |
| 4,220,931 | 9/1980 | Hines et al. ..................... 358/176 X |

Primary Examiner—Robert L. Richardson

[57] ABSTRACT

Disclosed is a DC-coupled video amplifier with AGC feedback having a stable operating point. Shifting of sync tip DC level resulting in a loss of synchronization of the video signal is compensated for by means of a feedback loop in the video amplifier thus providing a level video output signal.

10 Claims, 5 Drawing Figures

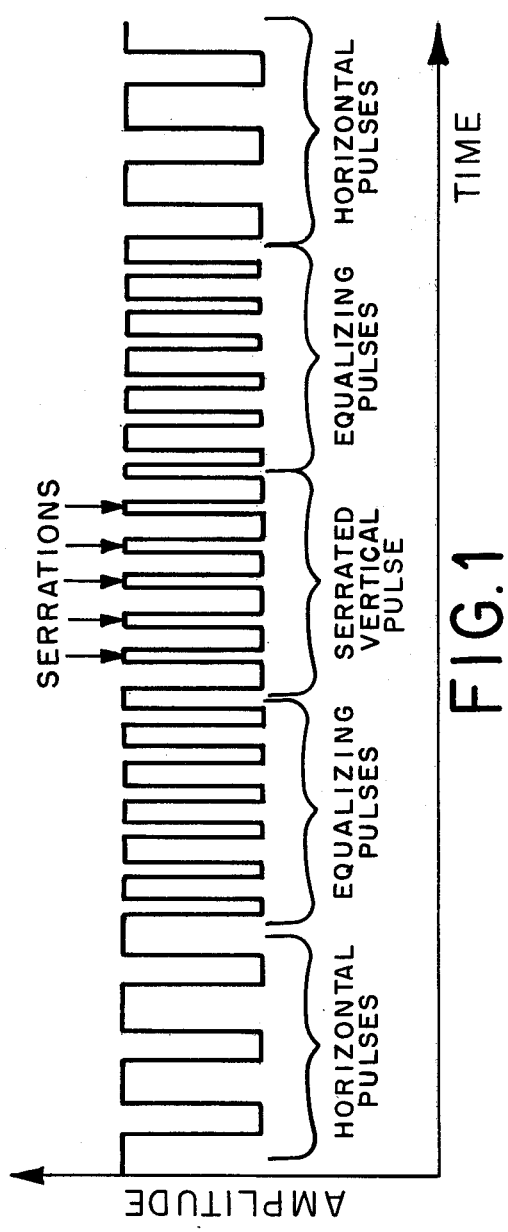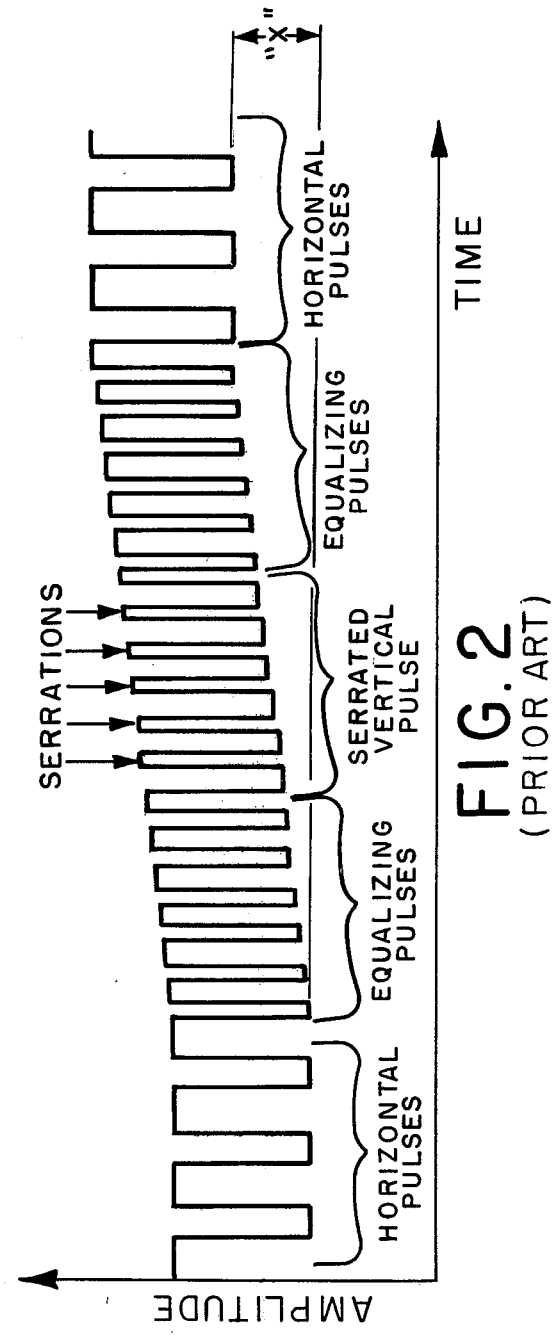

AGC-CLAMPED VIDEO AMPLIFIER

BACKGROUND OF THE INVENTION

This invention relates generally to a video amplifier for the video display of a television receiver, and particularly relates to a video amplifier having an AGC-clamped feedback loop for level video signal output.

The signal transmitted to and received by a television receiver is termed a composite video signal which includes periodic horizontal and vertical synchronizing pulses for synchronizing television receiver scanning circuits which drive the receiver's kinescope. The synchronizing pulses ensure that the television receiver's scanning circuitry is synchronized with the associated scanning circuitry of the image pick-up device located at the television transmitting station. In the kinescope, the electron beam, or electron beams in the case of a color television receiver, is deflected to produce a horizontal trace line on the kinescope's faceplate. Following completion of a horizontal scan line, the electron beam is rapidly deflected back to the beginning of the next horizontal line and horizontal sweep, or trace, is re-initiated. During horizontal sweep the electron beam is modulated in accordance with video signals provided to the television receiver. The period during which the electron beam is rapidly deflected back to its sweep start position is termed the horizontal re-trace interval. In addition to the electron beam horizontal trace and re-trace intervals, the electron beam is also vertically deflected at a slower rate to permit the electron beam to scan the television receiver's faceplate in a horizontal line-by-horizontal line fashion from the top to the bottom of the screen. Because many horizontal trace lines are used during a single vertical trace interval the receiver's electron beam is horizontally deflected at a much higher rate than its vertical deflection rate.

The composite video signal includes three components: a camera signal incorporating the desired picture information, synchronizing pulses for synchronizing transmitter and receiver scanning, and blanking pulses to make vertical and horizontal retrace invisible. With retrace being initiated by the horizontal or vertical synchronizing pulses, the synchronizing pulses are transmitted as part of the picture signal but are sent during the blanking period when no picture information is transmitted. Part of the modulated picture signal amplitude is used for the synchronizing pulses and the remainder includes the camera signal. The synchronizing pulses are frequently termed sync pulses. The form of the synchronizing pulses is illustrated for the ideal situation in FIG. 1. The synchronizing pulses shown include from left to right three horizontal pulses, a group of six equalizing pulses, a serrated vertical pulse, and six additional equalizing pulses which are followed by three more horizontal pulses. Only three horizontal pulses are shown on each side of the equalizing pulses and serrated vertical pulse for brevity sake, but in practice there are 262.5 horizontal pulses between each vertical pulse. These horizontal pulses represent horizontal trace lines and correspond to one field with the video presentation made up of two interlaced fields. Each field is separated by one wide vertical pulse, which is actually composed of six individual pulses separated by the five serrations. The five serrations are inserted in the vertical pulse at half-line intervals and the equalizing pulses are also spaced at half-line intervals. The equalizing pulses provide identical wave shapes in the separated vertical synchronizing signal for even and odd alternating fields so that constant timing can be obtained for good field interlace. The vertical synchronizing pulse extends over a period equal to six half lines or three complete horizontal lines making it much wider than a horizontal pulse in order to facilitate separation of these synchronizing pulses at the receiver.

Because of the high voltages utilized in the typical television receiver, consumer safety standards dictate that the user be adequately isolated. Thus, double isolation is generally provided in the form of a high voltage sweep transformer and a video transformer. Because of the large bandwidth of the video signal and limitations in the transfer response of the video transformer, a portion of the composite video signal is lost in this stage of video signal processing. In particular, because of the inherent characteristics of the video transformer and size, winding, etc., limitations placed on it in the television receiver environment, a segment of the low frequency portion of the video signal is lost. While this frequency cut-off characteristic of the video transformer does not have an adverse effect on the video signal itself, it does impact synchronization (sync) pulse tip level. The absence of a low frequency component in the video signal causes a shift in the DC level of the sync tips. This signal shift is due to transformer coupling characteristics and the effect of the transformer inductance on signal transfer between transformer windings. The effect of the loss of low frequency components of the video signal on the sync pulse tip levels is shown in FIG. 2. Rather than the level sync pulse amplitude throughout the entire video signal is shown in FIG. 1, there's now a shift in sync pulse tip level due to the loss of lower frequencies from the video signal. The magnitude of the sync tip level shift is designated by an "X" in FIG. 2. This sync tip level shift produces a loss of or inability to achieve vertical synchronization in a television receiver. This results in vertical roll in the video display because of the inability of vertical sync separator circuitry to differentiate between sync pulse level and the reference black level. In older television receivers this undesirable condition could be corrected by manually adjusting vertical synchronization circuitry to lock-on to the vertical sync pulse. However, the increasing use of vertical countdown systems in current production television receivers does not provide for such a manual vertical hold control, thus, in a television receiver utilizing a vertical countdown system it is impossible to manually adjust the vertical control to achieve vertical lock or synchronization.

One approach to providing a video signal with a flat frequency characteristic is disclosed in U.S. Pat. No. 4,184,176 to Sahara et al. This approach employs a feedback amplifier in the video output circuit of a television receiver with the feedback amplifier having two feedback circuits connected in parallel with one feedback circuit negatively feeding back a low frequency component of the output signal from the amplifying circuit to the input of the amplifying circuit. The other feedback circuit negatively feeds back a high frequency component of the output signal. With the two feedback circuits having substantially equal feedback ratios, it is maintained that the phase of the feedback signal can be maintained substantially constant regardless of changes in frequency of the input signal and instabilities in the amplifying circuit, so as to permit the frequency characteristic of the output video signal to be flat to ensure that the kinescope will reproduce a stable picture. While this approach addresses the problem of providing a flat frequency signal characteristic to the kinescope, it does not provide for frequency loss in the video signal caused by video transformer signal transfer characteristics. Another approach to maintaining stable video amplifier operation in a television receiver is disclosed in U.S. Pat. No. 3,970,895 to Willis in which is described a coupled transistor pair forming a luminance signal amplifier. A capacitive coupling device and a second transistor are coupled to the first transistor and form a clamping circuit for maintaining the voltage developed by the first transistor substantially independent of direct current conditions of the source of color difference signals and independent of the voltage applied by the luminance amplifier across the first transistor. One of these amplifiers with capacitively coupled feedback is provided for each of the three color difference signals in providing video signals to the various electron guns in the kinescope. While this approach apparently provides a flat frequency response over a wide video signal bandwidth, it also is not capable of providing frequency compensation for video signal bandwidth distortions caused by video transformer signal transfer characteristics.

These and other problems encountered in the prior art are avoided by the present invention which provides for a stable operating point for a video signal amplifier for the video display of a television receiver by means of an AGC feedback signal in ensuring a level video output signal and in particular a flat vertical sync pulse tip.

OBJECTS OF THE INVENTION

Accordingly, it is an object of the present invention to provide an improved video signal amplifier for use in the video display of a television receiver.

It is another object of the present invention to provide an improved means for generating a level video signal in a television receiver where video signal output level is independent of received signal strength.

Still another object of the present invention is to provide improved vertical synchronization in a television receiver by correcting for sync tip level variations.

A further object of the present invention is to provide a television receiver video amplifier with improved high voltage isolation and signal drift compensation.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings in which:

FIG. 1 illustrates the form of the synchronizing pulses of an idealized video signal containing horizontal pulses, equalizing pulses, and a serrated vertical pulse in which all pulse levels are essentially equal in magnitude;

FIG. 2 illustrates the distortion in synchronization pulse tip level caused by a low frequency losses in the video signal as experienced in prior art systems;

DESCRIPTION OF THE PREFERRED EMBODIMENTS

Figure 3:
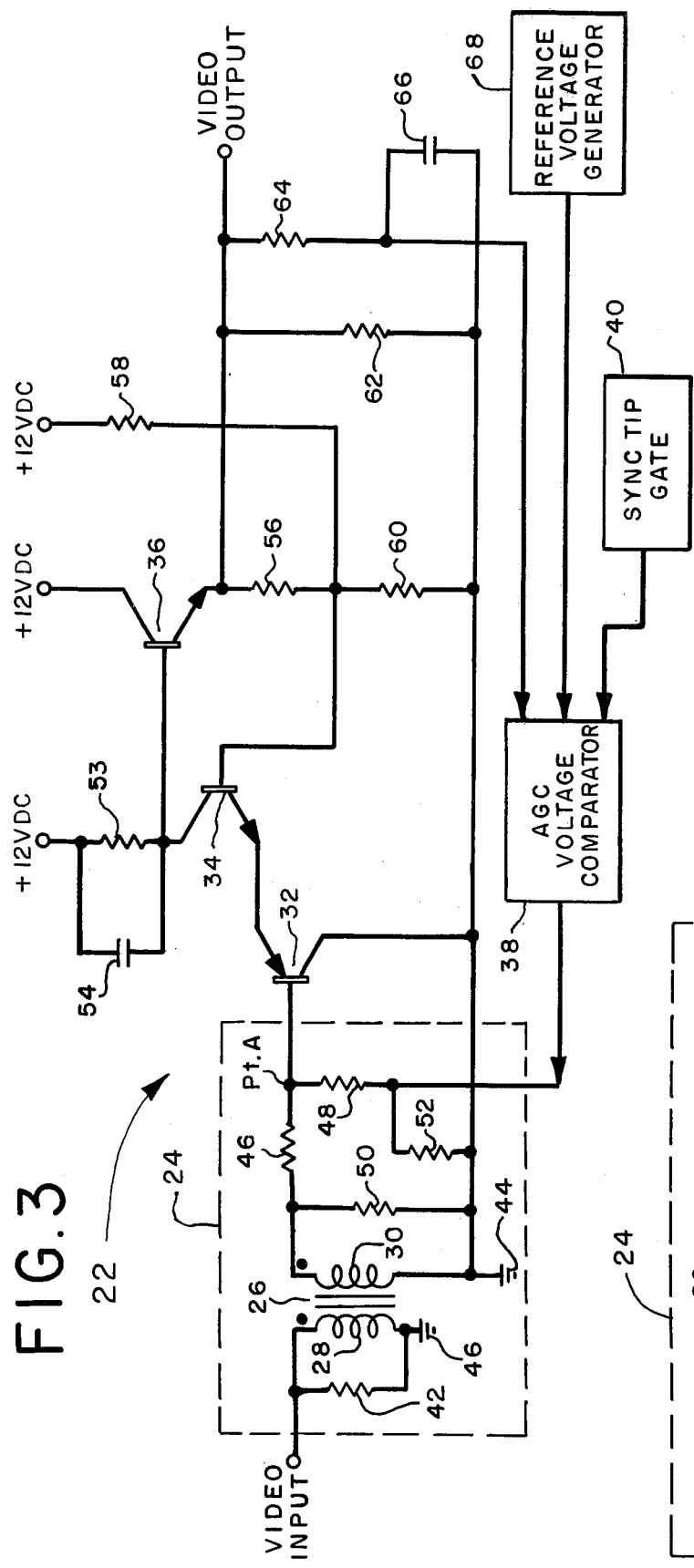
FIG. 3 which is partially in block diagram form and partially in schematic diagram form shows an AGC-clamped video amplifier coupled to a video transformer in accordance with a preferred embodiment of the present invention.

Referring to FIG. 3, there is shown an AGC-clamped video amplifier 22 for the video display of a television receiver in accordance with a preferred embodiment of the present invention. The composite video signal is provided to a video amplifier input stage 24 which includes video transformer 26. As shown, with primary winding 28 of video transformer 26 having the same polarity as secondary winding 30 an inverted composite video signal will produce an inverted signal at the output of transformer 26. This signal is provided to the emitter-follower common base amplifier combination of transistors 32 and 34. The amplified video signal produced by transistors 32 and 34 is provided to buffer transistor 36 which produces the video signal delivered to the kinescope's cathode, AGC circuitry, vertical and horizontal synchronization circuitry, and other television receiver subsystems. The AGC system compares sync tip level with a reference signal level by means of a voltage comparator 38 and provides a feedback control signal to transistors 32 and 34. Voltage comparator 38 is gated "on" during the sync tip interval by means of sync tip gate 40 so that only sync tip level is compared with the reference voltage level in providing an AGC-clamped sync tip level correction signal to the base of input transistor 32. In this manner, the AGC-clamped video amplifier of the present invention amplifies the baseband video signal applied to the video display of the television and not the modulated video signal provided to the television receiver.

In accordance with the present invention, a composite video signal such as that shown in FIG. 1 is provided to primary winding 28 of video transformer 26. Resistor 42 couples the input line to ground and, in combination with the parallel input impedance of transformer 26, terminates the video transmission line in approximately 75 ohms at midband frequency so as to minimize reflections along the input video transmission line. Ground point 46 is coupled to the primary, or input, winding 28 of transformer 26 and is thus a "cold" ground maintained at absolute ground potential. As shown in FIG. 3 the polarity of primary winding 28 and secondary winding 30 is the same so that the inverted composite AC video input signal produces an inverted video signal as the output of secondary winding 30. Video transformer 26 in combination with the high voltage sweep transformer (not shown) provides the required double isolation safety margin between the high voltage produced in the television receiver and the user.

With an input video signal peak-to-peak level of 1 volt and a 1:1 turn ratio between the primary and secondary windings of transformer 26, the output signal of transformer 26 is also 1 volt peak-to-peak. Because of the coupling characteristics between primary coil 28 and secondary coil 30 of transformer 26 a portion of the video input signal will be shifted in phase. This phase shift can be as large as 45 for lower frequencies of the composite video signal. While the loss of these frequencies has no significant impact on the video signal itself, it causes a shift in vertical sync pulse level as shown in FIG. 2 and as previously discussed. This level-shifted signal is then provided to the base of input transistor 32 and includes the video signal distortion which is compensated for by the AGC-clamped video amplifier 22 of the present invention.

One end of secondary coil 30 is coupled to the base of input transistor 32 while the other end of secondary coil 30 is coupled to "hot" ground 44. Grounding point 44 is maintained at chassis ground in potential and is thus termed "hot". With chassis ground 44 thus isolated by means of video transformer 26, the possibility of injury caused by defects in or failure of the high voltage sweep transformer (not shown) are minimized.

The output of secondary coil 30 is coupled to the base of input transistor 32 by means of resistor 46 which in combination with resistor 48 forms a voltage divider network. The voltage divider network of resistors 46 and 48 divides the video signal down by 2:1 which permits the winding ratio of transformer 26 to be 1:1 allowing an overall amplifier gain of less than 1 if necessary. The 1:1 turns ratio of transistor 26 reduces the cost of the transformer while providing greater flexibility in system component selection. Allowing overall amplifier gain to be less than 1 improves chroma cross talk performance in the chroma subcarrier region. Resistor 50 couples the output of transformer 26 to ground and matches the impedance of secondary winding 30 with the impedance of the transistor circuitry to be discussed shortly. An AGC-clamped feedback signal is coupled to the base of input transistor 32 at point "A" via resistor 48. Resistor 52 couples the AGC-clamped feedback signal to ground and provides biasing to reduce the output impedance of the AGC voltage comparator for impedance matching purposes with transformer 26.

Transistors 32 and 34 form an AC differential amplifier with +12 VDC applied to the collector of transistor 34. Transistor 32 is, in effect, an emitter follower amplifier while coupled transistor 34 operates as a common base amplifier with the emitters of both transistors coupled and the collector of transistor 32 coupled to ground. As shown in FIG. 3, in the preferred embodiment of the present invention transistors 34 and 36 are NPN transistors while input transistor 32 is a PNP transistor. Resistor 53 provides proper biasing of the amplifier combination of transistors 32 and 34 with respect to the +12 VDC applied to the collector of transistor 34. Capacitor 54 in parallel with resistor 53 provides amplifier oscillation compensation in providing dominant pole compensation for transistors 32 and 34. In the preferred embodiment of the present invention the value of resistor 52 is selected in combination with the values of the other system components described later to provide an open loop amplifier gain of approximately 90.

With a video input signal applied to the base of transistor 32, transistor 32 is rendered conducting which in turn causes transistor 34 to conduct. The amplified output is provided to the base of buffer transistor 36 rendering it conductive. Transistor 36 acts as an output buffer transistor which is used to provide a video output signal to video circuitry (not shown) and is also used to provide the video signal to the feedback clamp circuit. Transistor 36 is selected to reduce the gain to approximately 5.6 for the closed loop case. Thus, the 2:1 signal attenuation at the base of transistor 32 which provides an output voltage of 0.5 volt, in combination with the 5.6 closed loop gain results in a 2.8 Vpp (peak-to-peak) signal, a portion of which is fed back to the inverting input of the video amplifier at the base of transistor 34.

The parallel combination of resistors 56 and 58 establish the midband gain of video amplifier 22. In addition resistors 56 and 58 in combination with resistor 60 establish the DC voltage level a the base of transistor 34 which, in turn, establishes the voltage at the base of transistor 32 and sets the operating voltage level of the feedback clamp. Resistors 58 and 60 form a voltage divider network which, with the 5.6 closed loop amplifier gain, permits the base of transistor 32 to be operated at a voltage greater than 0. Resistor 62 draws a quiescent current to ground to ensure that transistor 36 does not cutoff during low current and low voltage conditions. Resistor 64 in combination with capacitor 66 acts as a low pass filter for the amplified signal provided to voltage comparator 38 by rolling off the high frequency noise and the chroma subcarrier. Thus, an essentially noiseless video signal is provided to AGC voltage comparator 38. +12 VDC is applied across resistors 53 and 58 for proper amplifier biasing with +12 VDC also applied to the collector of transistor 36. Thus, the DC-restored sync tip level at the emitter of transistor 36 is 4 volts, and with a maximum swing of approximately 2.8 volts, the output signal provided to the feedback clamp circuit varies from approximately 4 volts to 6.8 volts. The amplified video output signal is coupled to AGC voltage comparator 38 to which are also coupled reference voltage generator 68 and sync tip gate 40.

In general, an AGC circuit is used in a television receiver to provide a suitable control voltage to the radio frequency (RF) and intermediate frequency (IF) amplifier stages of the receiver. This control voltage is used to effect a variation in the gain of these stages inversely in accordance with the level of the synchronizing pulse components of the video signal in providing a constant peak amplitude composite video signal. The AGC signal is generally produced by sampling the peak level of the synchronizing pulse components of the composite video signal by means of a signal peak detector. Because of the noise susceptibility of the peak detector, gating means are generally provided for gating the AGC circuit "on" only during the relatively short horizontal retrace or flyback pulse period produced by the horizontal deflection system. With the horizontal retrace pulses locked in phase with the sync pulses produced by the sync separator impulse noise occurring in the video signals during the remainder of line scan cannot affect the operation of the AGC circuit. It is for this reason that sync tip gate 40 is incorporated in the present invention and, in effect, selectively turns AGC voltage comparator 38 "on" and "off".

This type of AGC system is generally termed a gated video AGC system and the details of such do not form a part of the present invention. Thus, any of the more conventional gated video AGC systems may be incorporated in the present invention. Similarly, the video amplifier stage described above makes use of commonly known operational amplifier theory and techniques and its specific embodiment does not form a part of the present invention. Thus, any equivalent signal amplifier configuration could be used in the present invention without degrading system performance.

Inside AGC voltage comparator 38 the horizontal sync pulse tip level is compared to a reference level signal provided by reference voltage generator 68. As stated earlier, this normally results in the generation of a feedback signal to the RF and IF amplifier stages to maintain horizontal sync tip level at 4 volts. In the present invention a feedback signal is provided to the base of input transistor 32. This AGC-clamped feedback signal thus controls the voltage level of the base of input transistor 32 of the video signal amplifier and thus precisely controls the video input signal level provided to video amplifier 22. This ensures a level vertical retrace pulse free of distortion cause by the poor low frequency response of transformer 26 permitting accurate vertical sync detection and avoiding video display vertical roll. The feedback signal used in the present invention for correcting for this video signal level shift is produced by comparing sync pulse tip level with a reference voltage and generating a difference signal. It is this signal which is fedback to the input of the video amplifier in correcting for distortions in the vertical sync pulse of the composite video signal.

Figure 4:
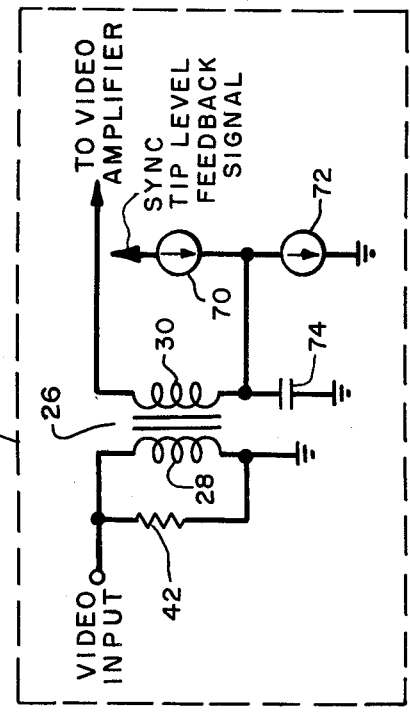
FIG. 4 shows another embodiment of the input stage of the present invention.

While any of the more common AGC voltage comparators currently in use could be utilized in the present invention, FIG. 4 illustrates a video amplifier input stage 24 with an AGC voltage comparator scheme utilized in a preferred embodiment of the present invention. Signal level correction is made by means of current sources 70 and 72. The sync tip level signal from the video amplifier is provided to current source 70 which is coupled to current source 72. If the video level is too high, current source 72 generates a larger current than that produced by current source 70 and this has the effect of drawing current from capacitor 74 which is coupled to the junction of and charged by current sources 70 and 72. This provides a discharge path for capacitor 74 to ground and reduces the voltage provided by secondary coil 30 to the base of the video amplifier input transistor 32. This results in a lowering of the video output signal level. If the sync pulse tip level signal provided to current source 72 is lower than a predetermined value, the current provided by current source 70 exceeds that of current source 72 with the result that capacitor 74 is charged via current source 70. This results in an increased signal level at the base of input transistor 32 and an increase in sync pulse tip level. In this manner variations in sync pulse tip level are compensated for by a feedback signal clamped to AGC comparator circuitry.

Figure 5:
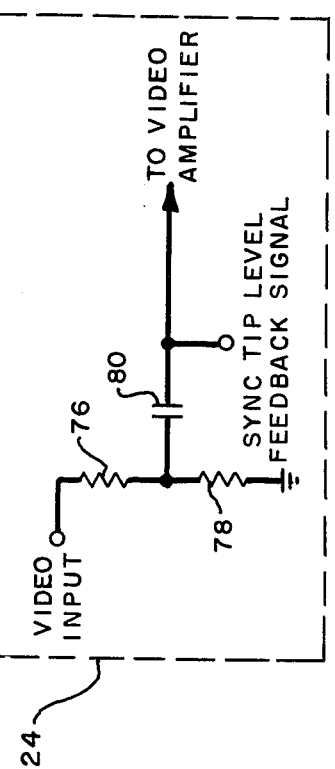
FIG. 5 shows a preferred embodiment of the input stage of the present invention in the absence of a video transformer.

Shown in FIG. 5 is another embodiment of the video amplifier input stage 24 which could be employed in the present invention. This embodiment does not take advantage of the double high voltage isolation provided by transformer 26 and operates without this transformer. Instead the video input signal is provided directly to a voltage divider network consisting of resistors 76 and 78. With the resistive network of resistors 76 and 78 coupling the video input signal to ground and to the base of video amplifier input transistor 32, the sync tip DC level is shifted at the base of transistor 32 to provide the desired sync tip level input to the video amplifier. The sync tip level feedback signal is provided to capacitor 80 by means of the AGC feedback clamp as previously described and this imposes a sync tip level correction signal on the video input signal. In this manner the sync tip level provided to the video amplifier is adjusted to provide a level vertical sync signal to vertical synchronization circuitry in ensuring more accurate vertical sync.

In a practical example of the present invention, the following values are assigned to various components of the AGC-clamped video amplifier to provide the previously discussed signal amplification for optimum sync tip level control and television receiver vertical synchronization:

| Reference No. | Preferred Value | |
|---|---|---|
| 42 | 82 | Ohms |
| 48 | 6.8 | Kilohms |
| 50 | 3.9 | Kilohms |
| 52 | 3.3 | Kilohms |
| 54 | 20 | Picofarads |
| 56 | 1.8 | Kilohms |
| 58 | 2 | Kilohms |
| 60 | 430 | Ohms |
| 62 | 820 | Ohms |
| 64 | 2.2 | Kilohms |
| 66 | 150 | Picofarads |
| 74 | 0.22 | Picofarads |
| 76 | 36 | Ohms |
| 78 | 36 | Ohms |
| 80 | .068 | Microfarads |

There has thus been shown an AGC-clamped video amplifier which provides sync tip level feedback control to compensate for poor low frequency response in a video signal amplifier where double high voltage isolation is provided by a video signal transformer. By thus shifting the sync tip DC level accurate vertical synchronization is achieved by taking advantage of existing AGC circuitry.

While particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In a video display of a television receiver including a source of video signals having a given received signal amplitude, said video signals including horizontal and vertical sync pulses for synchronizing television receiver horizontal and vertical scan with said video signals, and automatic gain control for comparing horizontal sync pulse voltage level with a reference voltage level and for generating an automatic gain control signal for adjusting video signal DC voltage level, a video feedback amplifier coupled to said source of video signals for amplifying and maintaining said video signals at a first predetermined voltage level, said video feedback amplifier comprising:

signal level shifting means coupled to said source of video signals for receiving said video signals and for adjusting said video signals to a second predetermined voltage level;
  amplifier means coupled to said level shifting means for receiving and amplifying said level-shifted video signals to generate video output signals; and
  clamping means coupled in a feedback configuration to said amplifier means for receiving said video output signals, comparing the horizontal sync pulse level of said video output signals to said reference voltage level and for clamping a predetermined point of said amplifier means to a correction voltage produced by the comparison of said horizontal sync pulse level with said reference voltage level in controlling vertical sync pulse level in synchronizing television receiver vertical scan with said received video signals.

2. A video feedback amplifier as in claim 1 wherein said amplifier means includes:
a first transistor means of a first conductivity type having base, emitter and collector electrodes, and having a said base electrode coupled to said signal level shifting means and to said clamping means for receiving said level-shifted video signals and said correction voltage, respectively;
second and third transistor means of a second conductivity type each having base, emitter and collector electrodes, with the emitter of said second transistor means being connected to the emitter of said first transistor means, the base of said second transistor means being connected to the emitter of said third transistor means and the collector of said second transistor means being coupled to the base of said third transistor means; and
means coupled to the collectors of said second and third transistor means for providing an operating direct voltage thereto.

3. A video feedback amplifier as in claim 1 wherein said signal level shifting means comprises a transformer including a primary coil coupled to said source of video signals for receiving said video signals and a secondary coil inductively coupled to said primary coil and connected to said amplifier means for providing said level-shifted video signals thereto.

4. A video feedback amplifier as in claim 3 wherein the primary coil of said transformer has twice the number of turns of said secondary coil.

5. A video feedback amplifier as in claim 3 further comprising a resistive network coupling the secondary coil of said transformer and said clamping means to said amplifier means for dividing down said level-shifted video signals with said primary and secondary coils having an equal number of turns.

6. A video feedback amplifier as in claim 3 wherein one end of said secondary coil is connected to said amplifier means with its other end connected to said clamping means and further comprising capacitor means coupling the end of said secondary coil connected to said clamping means to ground potential voltage, the charging and discharging of said capacitor means by the correction voltage from said clamping means regulating the voltage level of said video output signals.

7. A video feedback amplifier as in claim 1 wherein said clamping means further includes gating means for selectively initiating the comparison between horizontal sync pulse level and said reference voltage level during each horizontal sync pulse interval.

8. In a video display of a television receiver including a source of video signals having a given received signal amplitude, said video signals including horizontal and vertical sync pulses for synchronizing television receiver horizontal and vertical scan with said video signals, and automatic gain control for comparing horizontal sync pulse voltage level with a reference voltage level and for generating an automatic gain control signal for adjusting video signal DC voltage level, a video feedback amplifier coupled to said source of video signals for amplifying and maintaining said video signals at a first predetermined voltage level, said video feedback amplifier comprising:
signal level shifting means coupled to said source of video signals for receiving said video signals and for adjusting said video signals to a second predetermined voltage level;
amplifier means coupled to said level shifting means for receiving and amplifying said level-shifted video signals to generate video output signals, said amplifier means including:
a first transistor means of a first conductivity type having base, emitter and collector electrodes, and having said base electrode coupled to said signal
level shifting means and to said clamping means for receiving said level-shifted video signals and said correction voltage, respectively;
second and third transistor means of a second conductivity type each having base, emitter and collector electrodes, with the emitter of said second transistor means being connected to the emitter of said first transistor means, the base of said second transistor means being connected to the emitter of said third transistor means and the collector of said second transistor means being coupled to the base of said third transistor means; and
means coupled to the collectors of said second and third transistor means for providing an operating direct voltage thereto; and
clamping means coupled in a feedback configuration to said amplifier means for receiving said video output signals, comparing the horizontal sync pulse level of said video output signals to said reference voltage level and clamping a predetermined point of said amplifier means to a correction voltage produced by the comparison of said horizontal sync pulse level with said reference voltage level in regulating the level of said vertical sync pulses in synchronizing television receiver vertical with said received video signals.

9. In a video display of a television receiver including a source of video signals having a given received signal amplitude, said video signals including horizontal and vertical sync pulses for synchronizing television receiver horizontal and vertical scan with said video signals, and automatic gain control for comparing horizontal sync pulse voltage level with a reference voltage level and for generating an automatic gain control signal for adjusting video signal DC voltage level, a video feedback amplifier coupled to said source of video signals for amplifying and maintaining said video signals at a first predetermined voltage level, said video feedback amplifier comprising:
signal level shifting means coupled to said source of video signals for receiving said video signals and for adjusting said video signals to a second predetermined voltage level;
amplifier means coupled to said level shifting means for receiving and amplifying said level-shifted video signals to produce video output signals; and
clamping means coupled in a feedback configuration to said amplifier means and to said level shifting means for receiving said video output signals, comparing the horizontal sync pulse level of said video output signals to said reference voltage level and clamping the junction of said signal level shifting means and said amplifier means to a correction voltage produced by the comparison of said horizontal sync pulse level with said reference voltage level in regulating the level of said vertical sync pulses in synchronizing television receiver vertical scan with said received video signals, said clamping means including gating means for selectively initiating the comparison between horizontal sync pulse level and said reference voltage level during each sync pulse interval.

10. In a video display of a television receiver including a source of video signals having a given received signal amplitude, said video signals including horizontal and vertical sync pulses for synchronizing television receiver horizontal and vertical scan with said video signals, and automatic gain control for comparing horizontal sync pulse voltage level with a reference voltage level and for generating an automatic gain control signal for adjusting video signal DC voltage level, a video feedback amplifier coupled to said source of video signals for amplifying and maintaining said video signals at a first predetermined voltage level, said video feedback amplifier comprising:

signal level shifting means coupled to said source of video signals for adjusting said video signals to a second predetermined voltage level, said level shifting means including a transformer having a primary coil coupled to said source of video signals for receiving said video signals and a secondary coil inductively coupled to said primary coil;

amplifier means coupled to the secondary coil of said level shifting means for amplifying said level-shifted video signals, said amplifier means including:

a first transistor means of a first conductivity type having base, emitter and collector electrodes, and having said base electrode coupled to said secondary coil for receiving said level-shifted video signals;

second and third transistor means of a second conductivity type each having base, emitter and collector electrodes, with the emitter of said second transistor means being connected to the emitter of said first transistor means, the base of said second transistor means being connected to the emitter of said third transistor means and the collector of said second transistor means being coupled to the base of said third transistor means, and means coupled to the collectors of said second and third transistor means for providing an operating direct voltage thereto, with video output signals being provided at the emitter of said third transistor means; and clamping means coupled in a feedback configuration to said amplifier means and to said level shifting means for receiving said video output signals, for comparing the horizontal sync pulse level of said video output signals to said reference voltage level and for clamping the junction of said signal level shifting means and said amplifier means to a correction voltage produced by the comparison of said horizontal sync pulse level with said reference voltage level in regulating the level of said vertical pulses in synchronizing television receiver vertical scan with said received video signals, said clamping means including gating means for selectively initiating the comparison between sync pulse level and said reference voltage level during each sync pulse interval.

* * * * *